United States Patent [19]

Palfy

[11] 3,770,030
[45] Nov. 6, 1973

[54] DELIMBER

[75] Inventor: Robert Miklos Palfy, Laval Des Rapides, Quebec, Canada

[73] Assignee: Logging Development Corporation, Montreal, Quebec, Canada

[22] Filed: Mar. 7, 1972

[21] Appl. No.: 232,398

[30] Foreign Application Priority Data
Mar. 9, 1971    Canada .............................. 107262

[52] U.S. Cl. ............................ 144/2 Z, 144/208 E
[51] Int. Cl. ............................................ A01g 23/00
[58] Field of Search ............... 144/2 Z, 3 D, 208 R, 144/208 E

[56] References Cited
UNITED STATES PATENTS

| | | | |
|---|---|---|---|
| 3,572,410 | 3/1971 | McElderry | 144/2 Z |
| 3,183,952 | 5/1965 | Larson | 144/3 D |
| 3,398,774 | 8/1968 | Hahn | 144/309 AC |
| 3,461,926 | 8/1969 | Larson | 144/2 Z |
| 3,596,690 | 8/1971 | Hamilton | 144/2 Z |
| 3,653,417 | 4/1972 | Cervenak | 144/2 Z |

*Primary Examiner*—Gerald A. Dost
*Attorney*—Shanley & O'Neil

[57] ABSTRACT

A machine for removing the limbs from a tree while the same is being propelled through said machine, comprising in combination a frame including an aperture therein through which the tree passes during processing, a plurality of arcuate cutting members each having cutting edges facing in a substantially common direction, secured to said frame in substantially symmetrical arrangement about said aperture and adjacent the periphery of said aperture, each of said cutting members being pivotally secured to said frame by at least one link member and at least one arm member, and power means secured to said arm members and said frame for moving said arm members relative to said frame thereby providing traverse movement of said cutting members relative to said aperture.

9 Claims, 10 Drawing Figures

DELIMBER

This invention relates to tree delimbing devices and more particularly to the type known generally in the pulpwood harvesting industry as a stripper delimber.

Examples of known stripper type delimbers are disclosed in the following patents: Hamilton et al Canadian Patent No. 860,080 dated Jan. 5, 1971; Hahn's Canadian Patent No. 841,380 dated May 12, 1970; Faller et al Canadian Patent No. 833,312 dated Feb. 3, 1970; Jorgensen's Canadian Patent No. 779,081 dated Feb. 27, 1968; Larson's U.S. Pat. No. 3,461,926 dated Aug. 19, 1969; Winblad et al U.S. Pat. No. 3,348,592 dated Oct. 24, 1967; and Larson's U.S. Pat. No. 3,323,563 dated May 28, 1965.

Two major problems associated with the known devices are the quality of the delimbing obtained by such devices which is not always satisfactory and the operating efficiency of such devices.

In regard to the operating efficiency of such devices, some known examples in the prior art disclose limb cutting members which are mounted so as to move relative to one another in various planes rather than a common plane. Accordingly, during operation of such devices it has been found debris clogs between the cutting members and thus fouls the operation of the device. A further disadvantage with many present stripper type delimbers is that the cutting members encircle the tree to be delimbed and make only point contact with the tree trunk periphery and leave relatively large sections around the trunk periphery out of cutter contact which results in a poorly delimbed tree.

Accordingly, it is a prime object of the present invention to provide a device which will perform efficiently and reliably and which will delimb trees satisfactorily.

It is a further object to provide a device which will operate in conjunction with other tree processing devices, for example, a device which can be mounted in ganged relationship with other tree processing devices of the type known generally as the annular ring type. It will be appreciated that such device must operate in conjunction with a predetermined feed path along which the tree travels during processing by the other processing units mounted in conjunction therewith.

It is a further object of the invention to provide a device which will delimb trees efficiently regardless of varying diameters, namely to provide a delimber whereby the cutting members contact the periphery of the tree trunk generally to the same extent when processing a given diameter and a relatively larger or relatively smaller diameter.

It is a still further object of the present invention to provide a device which includes tree limb cutting members which are mounted so as to be movable relative to one another in a common plane.

In one aspect of the invention, there is provided a machine for removing the limbs from a tree while the same is being propelled through said machine, comprising in combination:
 a. a frame;
 b. a plurality of cutting members arranged in circumferential spaced relation around a common axis and each having an arcuate cutting edge;
 c. means mounting each of said cutting members on said frame comprising a link member and at least one arm member each pivotally attached to the frame and cutting member providing a parallelogram and having the pivot axes thereof parallel to said common axis; and
 d. power means secured to said arm members and said frame for moving said arm members relative to said frame thereby selectively providing movement of said cutting members in a direction toward and away from said common axis.

The invention is illustrated, by way of example, in the following drawings wherein.

Figure 1:
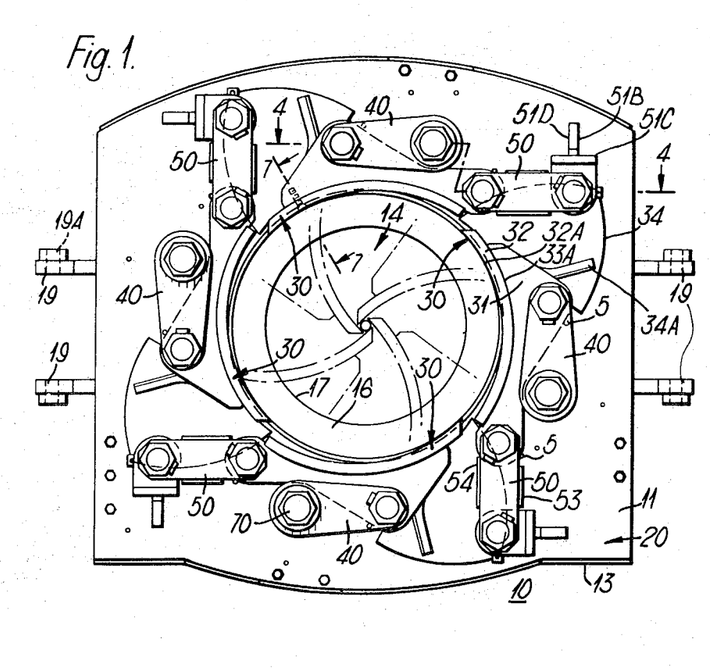
FIG. 1 is an elevational front view from the infeed side of a stripper type delimber in accordance with the present invention.

Referring to FIG. 1, shown therein is an annular ring-type stripper delimber 10, consisting of a frame 20, having a plurality of arcuate cutting members 30 mounted thereon, each by an arm member 40 and a link member 40. Each of the arms 40 is pivotally mounted on the frame by a pivot pin 70, such pivots being interconnected by a linkage system 60 illustrated in FIG. 3, synchronizing pivotal movement of the pivot pins, the entire linkage being actuated by a hydraulic piston-cylinder assembly 80.

The frame 20 is a box-like structure consisting of a front plate 11 and a rear plate 12 secured to a peripheral frame 13 as by welding and/or bolt nut assemblies. The peripheral frame 13 holds the front and rear plates in spaced relation relative to one another and portions of the front and rear walls and/or peripheral frame may be detachable providing access to an area within the enclosure provided by the plates and frame.

The peripheral frame 13 is provided with two pairs of lugs 19, each having an aperture 19A therethrough for receiving a pin to mount the assembly on respective ones of the pair of spaced-apart rigid beam members. The pairs of lugs 19 are directed outwardly in a direction away from one another as illustrated in FIG. 1, thereby adapting the assembly to be mounted on a framework, for example, a pair of spaced-apart beams disclosed in detail in Hamilton U.S. Pat. No. 3,351,107 issued Nov. 7, 1967.

The frame 20 has a central aperture 14 through which the trees pass endwise during processing thereof, the aperture being defined by a circular housing 15 having a tapered section 16 connected to a terminal end section 17 of smaller diameter. The axis of the aperture 14 is, in fact, a longitudinal axis of a feed path along which a tree passes through the delimber while being propelled endwise for processing thereof in removing limbs with the cutters. Various means may be used to propel the trees, for example, driven feed rolls disclosed in the aforementioned U.S. Pat. No. 3,351,107 or as disclosed in Canadian Patent No. 807,454, issued Mar. 4, 1969.

The arcuate cutting members 30 include a knife holder 31 and a cutting blade 32 detachably secured thereto. Each cutting blade has a cutting edge 32A facing in the direction toward trees fed into the aperture 14 from the infeed side and arcuate about the path along which the tree travels during processing thereof.

Figure 4:
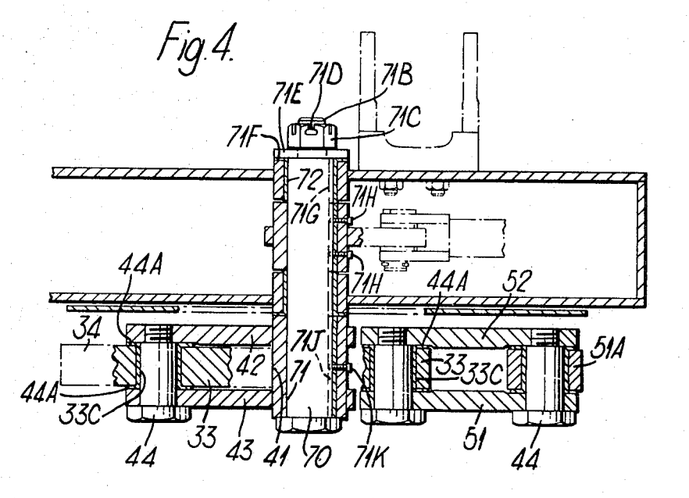
FIG. 4 is a cross-sectional view taken along line 4—4 in FIG. 1.
Figure 7:
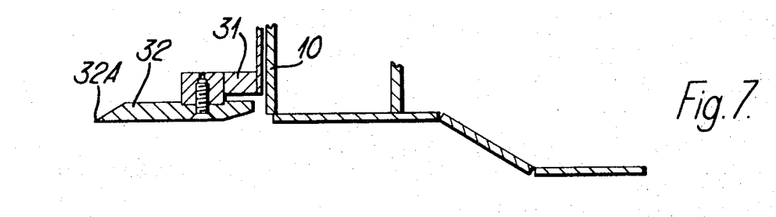
FIG. 7 is a cross-sectional view taken along line 7—7 in FIG. 1.

Each knife holder 31 comprises an elongated block 33 having an arcuate edge 33A to accommodate the arcuate cutting blade 32. Block 33 has a pair of spaced-apart apertures 33B which accommodate bushings 33C as shown in FIG. 4. If desired, additional plate members 34 as indicated in FIGS. 1, 4 and 7 may be secured by welding or the like in spaced relation to block 33 utilizing a spacer block 34A. The plate members 34 will thus move with the cutting member 30 and provide a selected partial blockage of aperture 14, the blockage increasing as the free end of cutting blade 32 moves towards the central axis of aperture 14. The said blockage of the aperture relative to the cutting members is an optional feature which under certain conditions may enhance operation of the delimber by preventing debris to jam in between the terminal ends of the cutting blade 32.

The cutting blade 32 is detachably secured to knife holder 31 by a plurality of countersunk screws 35 thus providing simple servicing in replacing worn out cutting members.

As mentioned previously the cutting members 30 are secured to frame 20 by an arm member 40 and a link member 50. The mounting of the cutting member 30 is best shown in FIG. 4 wherein it will be seen that arm member 40 comprises a sleeve member 41 having a pair of members 42 and 43 secured thereto in spaced relation by welding or the like. Members 42 and 43 are apertured to receive sleeve 41 and also special cap screw 44. Members 42 and 43 may be made from plate material suitably contoured. It will be noted that adjacent bushing 33C and members 42 and 43 there are thrust washers 44A. It will be realized that special cap screw 44 is a shouldered shaft for bearing 33C. Sleeve 41 includes a suitable aperture for journalling on shaft 71 and is secured under the head 71A thereof. A thrust washer 41A is inserted adjacent sleeve 41 and bosses 73 on shaft 71.

Link member 50 includes a pair of members 51 and 52 as referred to in FIG. 4 and which are positioned in spaced relation by a pair of plates 53 and 54 welded thereto. Plates 51 and 52 are apertured to receive special cap screw 44 and they are suitably contoured being made from plate material. Link member 50 is secured at one end to block 33 and utilizes thrust washers 44A adjacent members 51 and 52 respectively. Link member 50 is secured to frame 20 in similar fashion to block 33. Members 51 and 52 straddling a lug 51A which in turn is secured to bracket 51B which is secured to plate 11 by welding or the like. Bracket 51B comprising a plate-like member 51C secured perpendicular to plate 11 and having a gusset 51D which is welded to member 51C and plate 11.

Lubrication fittings 5 are located adjacent bearings of arm member 50 and link member 50 as indicated in FIG. 1.

Figure 3:
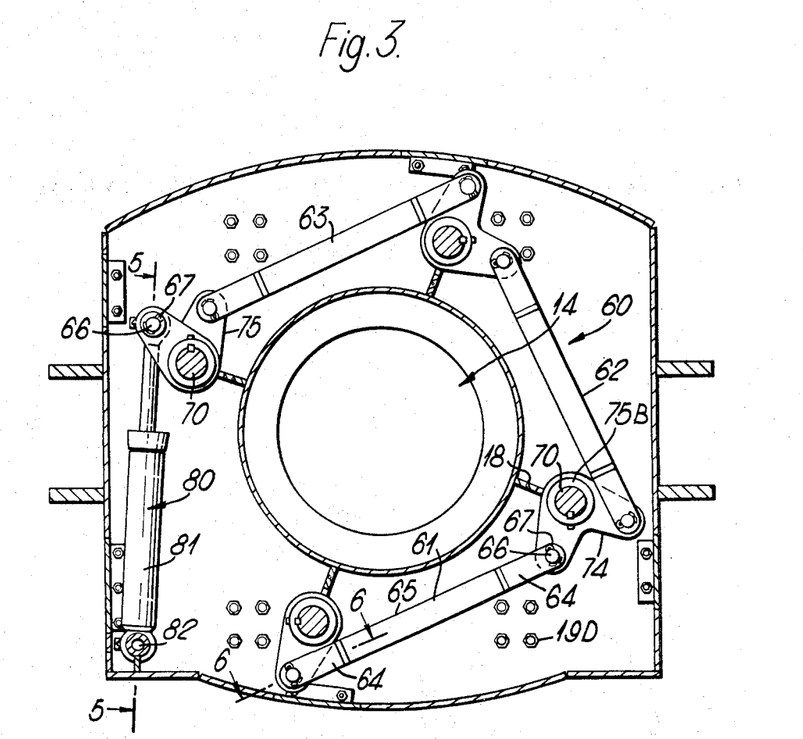
FIG. 3 is a part sectional elevational view taken along line 3—3 in FIG. 2.

The plurality of pivots 70 shown in FIG. 3 are secured to frame 20 as shown in detail in FIG. 4. Pivot 70 comprises a shaft 71 having a hexagonal head 71A and a threaded portion 71B which accommodates a castellated nut 71C locked by cotta pin 71D. A suitable spacer 71E is located under the head of the castellated nut and abuts against a thrust bearing 71F. Shaft 71 is supported in frame 20 by a pair of bearings 72 suitably secured in a pair of bosses 73 welded in position in frame 20.

Shaft 71 has keyed to it crank arm 74 in two instances as shown in FIG. 3. Crank arms 75 and 76 are of similar construction but slightly different configuration to suit respective connections to power means 30 and link means 60.

Crank arms 74, 75 and 76 are keyed in position on shaft 71 by key 71G in conjunction with cap screws 71H. Crank arms 74, 75 and 76 may be fabricated from steel plate suitably contoured and apertured to receive steel tubing and thereafter welded, the tubing being cut to required length.

The linkage system 60 comprises a plurality of link members 61, 62 and 63 interconnecting crank arms 74, 75 and 76. Link members 61, 62 and 63 may be fabricated from steel bar stock or tubing cut to suitable length, contoured apertured and welded so as to provide clevises 64 interconnected by members 65. Clevises 64 are interconnected to respective crank arms 74, 75 and 76 by pins 66 held captive by cotta pin 67.

Figure 5:
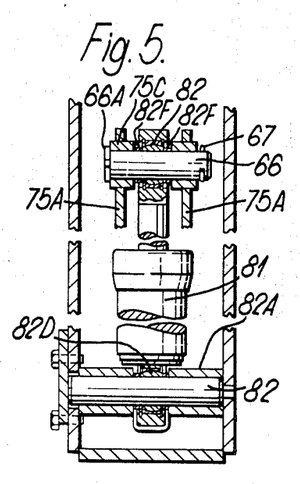
FIG. 5 is a cross-sectional view taken along line 5—5 in FIG. 3.

Power means 80 which includes a fluid cylinder 81 connected at the piston rod end to crank arm 75 via pin 66 held captive by cotta pin 67 is pivotally mounted at the cylinder end by a pin 82 as shown in FIGS. 3 and 5. The fluid cylinder 81 may be of any suitable commercially available type. It is, although not shown in the Figures, interconnected to a hydraulic power source controlled via suitable valving and located remote from the delimber. Referring to FIG. 5 which shows the detailed interconnection of fluid cylinder 81. Pin 82 is mounted in a pair of bushings 82A which may be made from selected tubing cut to suitable length and welded into position in frame 20. It will be noted that pin 82 is held captive within frame 20 by end plate 82B secured by cap screws 82C threaded into frame 20. Fluid cylinder 81 at the cylinder end includes a bushing housing a commercially available spherical bearing 82D mounting the same upon pin 82. The piston end of fluid cylinder 81 includes a further spherical bearing 82E for mounting upon pin 66 in crank arm 75. Spacers 82F and 82G are inserted respectively on pins 66 and 82 as shown in FIG. 5 to take up end play in respective bearings 82D and 82E.

It will be noted that crank arm 75 connection to the piston rod end of fluid cylinder 81, includes a pair of plate members 75A suitably contoured and apertured to receive bosses 75C and 75B welded thereto. Also, pin 66 includes a head portion 66A. Crank arm 75 is likewise keyed to pivot 70 in similar fashion to crank arms 74 and 76. It will be further noted that side plate 13 adjacent the fluid cylinder 81 hydraulic port connection is apertured to provide access for hydraulic hosing or piping connections to fluid cylinder 81.

Figure 6:
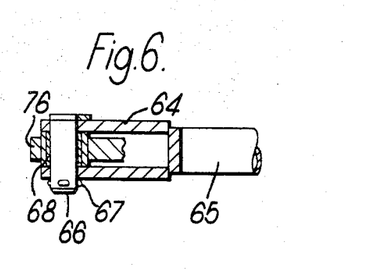
FIG. 6 is a cross-sectional view taken along line 6—6 in FIG. 3.

With regard to the link connection to crank arm 76 which is typical of all clevis 64 connections to crank arms 74 and 75, FIG. 6 illustrates the connection in detail. It will be noted that a bearing 68 is fitted within the crank arm 76 so as to minimize wear at the pivot connection. The bearing may be of any commercially available suitable type.

From the foregoing, it will be realized that the pivots 70 to which arm members 40 are connected, are rotated by a power means which includes a link system interconnecting the pivots 70 and interconnected to a fluid cylinder, the whole of which is conveniently enclosed for protection within the box-like frame 20.

Figure 2:
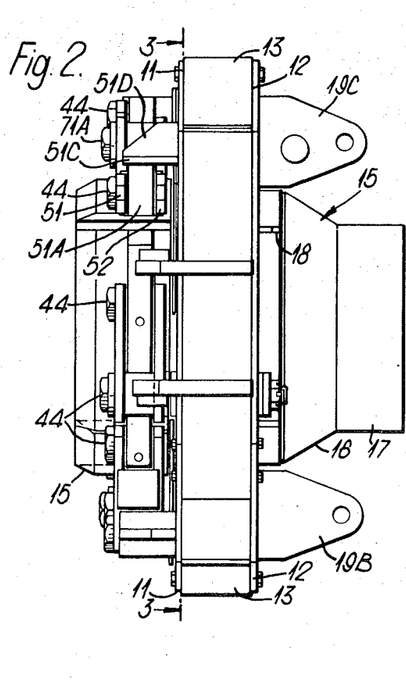
FIG. 2 is a side elevational view of the delimber shown in FIG. 1.

Referring to FIG. 2, additional lugs 19B and 19C are secured to rear plate 12 for use in securing arm members of tree feed rolls, which are not shown, if desired. Attention is drawn to FIG. 3 wherein four groups of four nuts 19D which are welded about apertures in plate 12 are utilized for securing a pair of the lugs 19B and a pair of the lugs 19C respectively with cap screws not shown.

From the foregoing, it will be evident that upon activation of fluid cylinder 81 which causes the piston rod to extend therefrom, pivots 70 will rotate in a clockwise direction thereby causing the cutting members 30 to move in a direction away from the central axis of aperture 14. Reverse direction of the piston rod of fluid cylinder 81 will naturally reverse the direction of the movement of cutting members 30 thus bringing them to the central axis of aperture 12 as shown in phantom line in FIG. 1.

The fluid cylinder 81 may, if desired, be connected to a hydraulic circuit which includes a hydraulic accumulator. Such arrangement will provide a certain resilience to the mounting of the cutting members thus giving some flexibility to the clamping action of the cutters when embracing a tree being or to be processed.

In operation, a tree to be delimbed is fed by a suitable means such as a boom and grapple to the delimber. Examples of suitable boom and grapple assemblies are disclosed in Hamilton et al Canadian Patent No. 860,080 dated Jan. 5, 1971 and Hamilton's U.S. Pat. No. 3,351,107 dated Nov. 7, 1967, said boom being mounted on a suitable frame adjacent the delimber 10.

The butt end of the tree is introduced through aperture 14, the longitudinal axis of the tree being generally coincident with the longitudinal axis passing through aperture 14. The tree butt is advanced through the aperture 14 by said boom and grapple sufficiently to engage tree propelling means such as feed rolls or other suitable tree feeding means not shown which thus grips the leading butt end of the tree and commences to propel the same thorugh aperture 14. As the tree is beginning to be propelled by the tree feeding means the cutting blades 32 of the arcuate cutting members 30 are brought into contact with the periphery of the trunk of the tree. This is accomplished by activating fluid cylinder 81 by operation of the related hydraulic valving control therefor. This causes retraction of the piston rod end of the fluid cylinder 81 and consequently moves arm members 40 in an anti-clockwise direction as viewed in FIG. 1.

The cutting members 30 when moving towards the central longitudinal axis of aperture 14 and thus embracing the trunk of the tree to be delimbed have a motion similar to that of the closing of an iris. As the cutting edges 32A contact the tree, the members 34 which move together with cutting members 30, provide a generally effective barrier to tree branches attempting to pass in between the cutting members 30 adjacent the terminal ends of cutting blades 32.

The aforementioned iris-like motion of the four cutting members 30 as shown in FIG. 1, combined with the arcuate shape of the cutting edges 32A of cutting blades 32, the path of the cutting edges 32A of cutting blades 32 as they cross the fact of aperture 14 as provided by the ratio of dimensions of arm members 40 and link members 50 and connections and disposition thereof on frame 20, provides a stripper type delimber wherein the cutting edges 32A of the cutting members 30 encircle the trunk of a tree in a common plane and the extent of cutter contact with the trunk is substantially the same over a variety of tree diameters ranging from the smallest as diagrammatically shown in FIG. 1 by phantom line, to the largest which is determined by the diameter of tree which will pass through aperture 14, at circular housing portion 17 diameter.

Therefore, as the tree to be delimbed is propelled through aperture 14 by the means discussed and with the cutting members 30 being biased against and encircling the tree trunk as discussed, the tree is efficiently delimbed. The branches which are removed from the tree during the delimbing operation fall to the ground adjacent the infeed side of the delimber and thus do not interfere with the operation of the same.

As mentioned above, the ratio of dimensions of the arm members 40 and link members 50 is important, that is, in regard to the pivot centres of the respective ones. The pivot centres of each arm member 40 and link member 50 should be as disclosed in the present embodiment, spaced respectively similar in terms of dimension. In the event that the pivot dimensions are not similar, the pivot locations of arm members 40 and link members 50 to frame 20 would require adjustment in order to obtain similar movement of cutting members 30 relative to aperture 14 as per the present embodiment.

Although not shown, means may be added to the delimber shown which will automate or semi-automate its operation. For example, the cutting members 30 can be programmed to move to a first selected position relative to frame 20 to a second selected position relative to frame 20 by installing for example an electro-mechanical sensing device within the box-like area of frame 20 and adapting it to operate in conjunction with, for example, any of the crank arm members 74, 75 or 76, such sensing device being capable of transmitting an electronic signal to hydraulic valve mechanisms controlling the operation of fluid cylinder 81.

Figure 8:
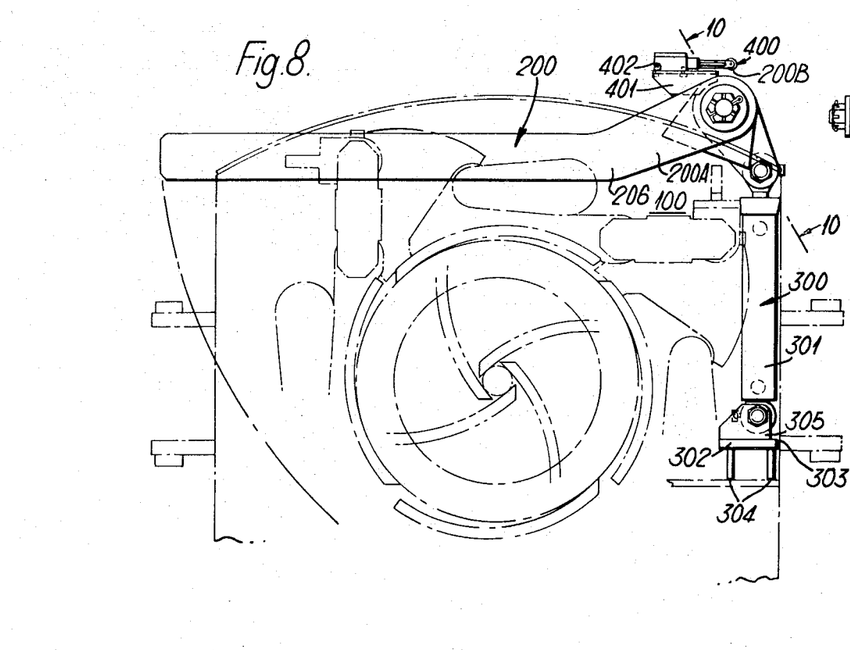
FIG. 8 is an elevational view of a tree topping device shown secured to a frame (in phantom line) in accordance with the present invention.
Figure 9:
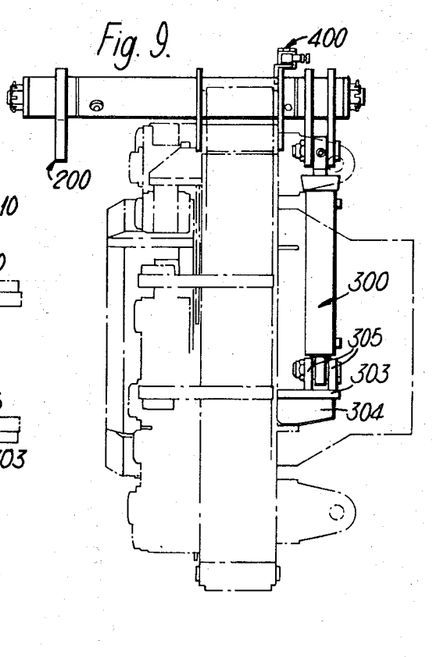
FIG. 9 is a side elevational view of the tree topping device shown in FIG. 8.
Figure 10:
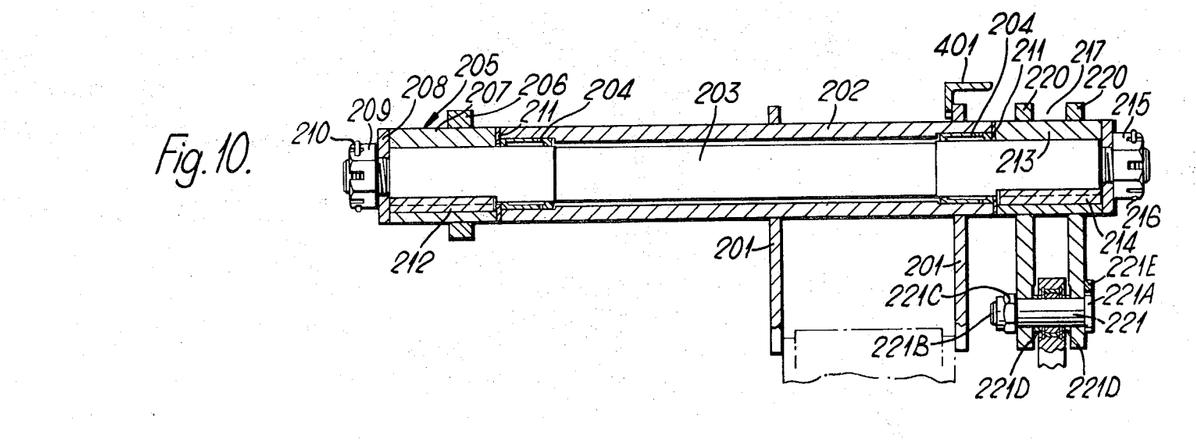
FIG. 10 is a part sectional view taken along line 10—10 in FIG. 8.

FIGS. 8, 9 and 10 as mentioned previously disclose a tree topping device 100 which includes an arm member assembly 200 and a power means 300.

It will be noted that the tree topping device 100 is secured to delimber 10 adjacent the infeed side thereof and is adapted to function in conjunction with delimber 10.

Arm member assembly 200 is best illustrated in FIGS. 9 and 10 wherein it is seen to comprise a number of parts. A pair of lug members 201 which may be made from plate-like material, suitably contoured and apertured to receive tube support member 202 which is welded or the like thereto. Likewise, lug members 201 may be welded to frame 20 or alternatively, detachably secured by suitable means. A shaft 203 is inserted within tube support member 202 and supported therein on a pair of bearings 204 mounted in spaced relation adjacent the terminal ends of tube support member 202. Bearings 204 may be press fitted into tube support member 202 or held captive by other suitable means. Lubrication access is also provided to bearings 204 via lubrication nipples and related passageways not shown. Bearings 204 may be of any suitable commercially available type.

An arm member sub-assembly 205 comprises an arm member 206 which may be fabricated from suitable bar stock, contoured and of sufficient length to sweep across the face of aperture 14 as indicated by the curved phantom line in FIG. 8 adjacent the free end of arm member 206. Arm member 206 is apertured to receive collar 207 to which it is secured by welding. A circular end disc 208 is secured by welding to the end face of collar 207. End disc 208 is apertured to receive the threaded terminal end of shaft 203. Referring to FIG. 10, it will be seen that arm member sub-assembly 205 is held captive on shaft 203 by a castellated nut and cotta pin 209 and 210 respectively. A thrust washer 211 on shaft 203 provides a wear surface between tube support member 202 and arm member sub-assembly 205. A key 212 is inserted in a keyway in shaft 203 and collar 207 to provide a locking means therebetween and thus avoid slippage. Key 212 is retained endwise by a shoulder in shaft 203 and end disc 208.

Referring now to the power means 300 connection to shaft 203. A collar assembly 213 is mounted upon the terminal end of shaft 203 and is secured thereto by a castellated nut and cotta pin 215 and 216 respectively, nut 215 being threaded upon shaft 203. Key 214 prevents slippage between collar assembly 213 and shaft 203. Key 214 is held captive in similar fashion to key 212.

Collar assembly 213 includes a collar 217 which may be made in similar fashion to collar 207, and circular end disc 219 welded together. A thrust washer 211 is mounted upon shaft 203 adjacent collar assembly 213 and tube support member 202.

A pair of lugs 220 depend from collar assembly 213 being secured to the same in spaced relation by welding or the like. Lugs 220 may be made from plate-like material, contoured and suitably apertured to receive collar assembly 213 and pin 221.

Power means 300 includes a fluid cylinder 301 having the cylinder end secured to frame 20 shown in phantom via a bracket assembly 302 and having the piston rod end connected to lugs 220 via pin 221.

Fluid cylinder 301, like fluid cylinder 81, may be of any suitable commercial type which includes similar spherical bearings at the piston rod end and cylinder end as discussed in respect of fluid cylinder 81. Fluid cylinder 301 is connected to a suitable pressurized fluid supply and its operation controlled via suitable valving not shown.

With regard to fluid cylinder 301 piston rod end connection to lugs 220. Referring to FIG. 10, it will be seen that pin 221 which includes a heat portion 221A and threaded portion 221B is inserted through apertures in lugs 220 and held captive by locking nut 221C. A pair of spacers 221D are inserted on either side of the spherical bearings to take up end play. A block 221E is welded to lug 220 adjacent the head 221A of pin 221 to prevent rotation of the same. Lubrication fittings are threaded into suitable passageways in fluid cylinder 301 adjacent the spherical bearings as shown in FIG. 8.

Bracket assembly 302 may be fabricated as disclosed in FIGS. 8 and 9 which include a plate member 303 welded to frame 20 in the manner disclosed and being additionally supported by a pair of gusset members 304 which are also welded to frame 20 and member 303. A pair of lugs 305 made from plate-like material, contoured and apertured to receive pin 221 are welded in spaced relation to member 303 and accommodate the cylinder end portion of fluid cynder 301. It will thus be realized that the cylinder end connection of fluid cylinder 301 to bracket assembly 302 is similar to the respective piston rod end connection to lugs 220.

An electro-mechanical switch 400 is mounted upon bracket 401 which is in turn secured to lug 201 by welding or the like.

Electro-mechanical switch 400 may be of any suitable known commercial type or alternatively of the type shown in FIG. 8 which includes electrical make and break contacts operated by a plunger with roller secured thereto and capable of transmitting a signal to operate hydraulic valving controlling the operation of fluid cylinder 301. Switch 400 is secured by a plurality of cap screws 402 to bracket 401.

Bracket 401 may be made as shown from commercially available structural angle, cut to the general configuration shown and then welded in place.

The tree topping device 100 may be mounted and operated in conjunction with any suitable tree processing unit or units or alternatively be mounted and operated in conjunction with delimber 10.

When the device is mounted to delimber 10 as shown, it may be operated generally as follows:

A tree is processed by delimber 10 in the manner as previously discussed and as the top portion of the tree approaches cutting members 30 namely at a selected distance between said top portion and the leading face of said cutting members, fluid cylinder 301 is activated by extending the piston rod end therefrom causing arm member 200 to swing across the face of aperture 14 and thereby lop off the top of the tree which falls freely to the ground or the like. It has been found unnecessary to sharpen the edge of arm member 200, which generally performs the lopping operation. As arm member 200 rotates with shaft 203 in an anti-clockwise direction as viewed in FIG. 8, edge 200A eventually makes contact with roller and plunger 200B on Switch 400 and activates the same sending a signal to control valving controlling the operation of fluid cylinder 301. Cylinder 301 is in turn activated to swing arm member 200 in a clockwise direction returning it to a position as shown in FIG. 8.

The tree topping device 100 may be operated semi-manually or alternatively, have its operation fully automated.

One example of automated operation is to employ a sensing device such as an electro-mechanical switch of the type mentioned previously, mounting the same adjacent cutting members 30 or related interconnecting linkages so that such device is activated by the same when the free ends of cutting members 30 move to a selected position relative to one another and the central axis of aperture 14, said sensing device upon activation transmitting a signal to operate controls for activating fluid cylinder 301 pivoting arm 200. The return of arm 200 to its initial starting position could, of course, be done by the means previously discussed.

The importance of the function of tree topping device 100 is to remove unwanted relatively small diameter tree portions and prevent their entering a tree processing unit. Thus, valuable time is saved in processing unwanted material.

I claim:

1. A stripper type tree delimber for removing the limbs from a tree while the same is propelled endwise therethrough comprising:
   a. a frame;
   b. a plurality of cutting members arranged in circumferential spaced relation relative to one another around a common axis and each having an arcuate cutting edge;
   c. means mounting each of said cutting members on said frame comprising a link member and an arm member, each pivotally attached to the frame and cutting member providing a parallelogram having the pivot axes thereof parallel to said common axis; and
   d. power means secured to said arm members and said frame for moving said arm members relative to said frame thereby selectively providing movement of said cutting members in a direction toward and away from said common axis.

2. A machine as defined in claim 1 wherein the pivotal connection of the parallelogram is such as to provide relative movement of the cutting members relative to one another in a common plane.

3. A machine as defined in claim 1 wherein at least four cutting members are mounted on said frame and have a free terminal end movable toward and away from said common axis at a rate of movement differing from that of the opposite free terminal end.

4. A machine as defined in claim 1 wherein said cutting members are arranged so as to move relative to one another to form an expandible and contractible iris-like aperture, the centre axis of such being substantially coincident with said common axis.

5. A machine as defined in claim 3 wherein the terminal ends of said cutting members are in generally end-to-end abutting relationship when moved to a position remote from said common axis.

6. A stripper delimber as defined in claim 1 wherein said cutting members are interconnected by further link members synchronizing movement of the cutting members.

7. A stripper delimber as defined in claim 1 wherein said frame is a box-like assembly having a central aperture through which the trees pass endwise during delimbing and wherein said cutting members are symmetrically arranged about the axis of said aperture.

8. A stripper delimber as defined in claim 7 wherein said power means, and further links interconnecting said cutting members synchronizing movement of the same are located interiorly of said box-like assembly.

9. A stripper type delimber as defined in claim 1 including a further cutting knife pivotally mounted on said frame for movement about an axis substantially parallel to said common axis and power means for rotating said further cutting knife about said pivot axis.

* * * * *